US009705393B2

(12) United States Patent
Golder et al.

(10) Patent No.: US 9,705,393 B2
(45) Date of Patent: Jul. 11, 2017

(54) VOLTAGE REGULATOR

(71) Applicant: QUALCOMM TECHNOLOGIES INTERNATIONAL, LTD., Cambridge (GB)

(72) Inventors: Barnaby Golder, Ely Cambridgeshire (GB); Peter Andrew Rees Williams, Cambridge (GB); Sukanta Kishore Panigrahi, Cambridge (GB); Timothy Charles Clapp, Sawston (GB); Richard Andrew Wilkinson, Ely (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 738 days.

(21) Appl. No.: 14/143,150

(22) Filed: Dec. 30, 2013

(65) Prior Publication Data

US 2015/0188407 A1    Jul. 2, 2015

(51) Int. Cl.

| H02J 1/00 | (2006.01) |
|---|---|
| H02M 3/158 | (2006.01) |
| H02M 1/088 | (2006.01) |
| H02M 1/00 | (2006.01) |

(52) U.S. Cl.
CPC ............. *H02M 1/088* (2013.01); *H02J 1/00* (2013.01); *H02M 3/158* (2013.01); *H02M 3/1582* (2013.01); *H02M 2001/0003* (2013.01); *H02M 2001/009* (2013.01); *Y10T 307/406* (2015.04)

(58) Field of Classification Search
USPC ........................................................ 307/31
See application file for complete search history.

(56) References Cited

U.S. PATENT DOCUMENTS

| 5,861,735 | A | 1/1999 | Uchida |
|---|---|---|---|
| 9,106,133 | B2* | 8/2015 | Gilliom ................ H02M 3/158 |
| 2006/0221649 | A1 | 10/2006 | Yamanaka et al. |
| 2010/0225295 | A1 | 9/2010 | Kranz et al. |
| 2012/0286576 | A1* | 11/2012 | Jing ...................... H02M 3/156 307/43 |
| 2013/0214749 | A1 | 8/2013 | Huang et al. |
| 2015/0188402 | A1 | 7/2015 | Panigrahi |

OTHER PUBLICATIONS

GB Search Report issued in related GB Application No. 1413990.1, dated Jan. 19, 2015.

\* cited by examiner

*Primary Examiner* — Rexford Barnie
*Assistant Examiner* — Xuan Ly
(74) *Attorney, Agent, or Firm* — Procopio, Cory, Hargreaves & Savitch LLP (57) ABSTRACT

A method of operating a voltage regulator including a source voltage rail and a plurality of output voltage rails, the method including: converting a source voltage on the source voltage rail to a respective output voltage on each output voltage rail; selecting an output voltage rail; comparing the output voltage on the selected output voltage rail to a reference voltage for the selected output voltage rail; and if the output voltage of the selected output voltage rail is less than the reference voltage for the selected output voltage rail, controlling the voltage regulator to increase the output voltage on the selected output voltage rail, wherein the frequency at which an output voltage rail is selected is dependent upon the rate at which the voltage regulator has previously increased the output voltage on that output voltage rail.

18 Claims, 8 Drawing Sheets

VOLTAGE REGULATOR

BACKGROUND

Integrated circuit chips use power supplies to convert an input voltage from a power source to an output voltage across an output load. Typically, such power supplies are regulated in order to maintain a constant output voltage across the output load even if the output load changes and/or the input voltage varies.

Linear regulators are often used to provide this regulation. Linear regulators continually adjust a voltage divider network in order to maintain a constant output voltage. The difference between the input voltage from the power source and the output voltage across the load is dissipated as heat. Thus, linear regulators are not an efficient way to provide regulation of a power source unless the output voltage is very similar to the input voltage.

Switched mode power supplies utilise a different mechanism to provide the regulation. A switching arrangement is provided between the power source and the output load. The switching arrangement continually switches ON and OFF. In the ON state, the power source is connected to the output load. In the OFF state, the power source is not connected to the output load. The duty cycle (proportion of ON time) is selected in order to achieve the desired output voltage. Excess energy is stored in the circuit until it is released to the output load. Thus, switched mode power supplies are more efficient than linear regulators at regulating the supply of power from a power source to an output load.

It is known to utilise switched mode power supplies in integrated circuit chips to supply power to a plurality of output loads. These output loads may have different power requirements to each other. Additionally, power management considerations in integrated circuit chips are becoming increasingly important as the market demands greater functionality at lower power consumption rates. Thus, the power requirements of each output load may vary over time. Thus, there is a need for a power supply regulation system having a responsive control system to the power requirements of multiple output loads.

SUMMARY OF THE INVENTION

According to a first aspect of the disclosure, there is provided a method of operating a voltage regulator comprising a source voltage rail and a plurality of output voltage rails, the method comprising: converting a source voltage on the source voltage rail to a respective output voltage on each output voltage rail; selecting an output voltage rail; comparing the output voltage on the selected output voltage rail to a reference voltage for the selected output voltage rail; and if the output voltage of the selected output voltage rail is less than the reference voltage for the selected output voltage rail, controlling the voltage regulator to increase the output voltage on the selected output voltage rail, wherein the frequency at which an output voltage rail is selected is dependent upon the rate at which the voltage regulator has previously increased the output voltage on that output voltage rail.

Suitably, for each output voltage rail, the method comprises increasing the frequency at which that output voltage rail is selected if the rate at which the voltage regulator has previously increased the output voltage on that output voltage rail increases.

Suitably, for each output voltage rail, the method comprises decreasing the frequency at which that output voltage rail is selected if the rate at which the voltage regulator has previously increased the output voltage on that output voltage rail decreases.

Suitably, the method further comprises: selecting further output voltage rails to form a selection sequence; and performing the comparing step on each output voltage rail of the selection sequence, wherein a first output voltage rail is selected to be earlier in the sequence than a second output voltage rail if the rate at which the voltage regulator has previously increased the output voltage of the first output voltage rail is greater than the rate at which the voltage regulator has previously increased the output voltage of the second output voltage rail.

Suitably, the method further comprises: selecting further output voltage rails; performing the comparing step on each of the further output voltage rails; and if the rate at which the comparing step leads to the controlling step exceeds a threshold, increasing the frequency of the selecting and comparing steps.

Suitably, the voltage regulator comprises a comparator for performing the comparing step, the method comprising increasing the frequency of the selecting and comparing steps by increasing the comparison rate of the comparator.

Suitably, the method further comprises: selecting further output voltage rails; performing the comparing step on each of the further output voltage rails; and if the rate at which the comparing step leads to the controlling step is less than a threshold, decreasing the frequency of the selecting and comparing steps.

Suitably, the voltage regulator comprises a comparator for performing the comparing step, the method comprising decreasing the frequency of the selecting and comparing steps by decreasing the comparison rate of the comparator.

Suitably, the voltage regulator comprises a power source and a switching arrangement coupled between the power source and the plurality of output voltage rails, the method comprising controlling the voltage regulator to increase the output voltage on the selected output voltage rail by controlling the switching arrangement to apply current generated by the power source to the selected output voltage rail.

Suitably, the method comprises controlling the voltage regulator to increase the output voltage on the selected output voltage rail by applying a predetermined value of current to the selected output voltage rail.

Suitably, if the source voltage exceeds the output voltage on the selected output voltage rail by more than a predetermined value, the voltage regulator is controlled to operate in a buck mode to increase the output voltage on the selected output voltage rail.

Suitably, if the source voltage does not exceed the output voltage on the selected output voltage rail by more than a predetermined value, the voltage regulator is controlled to operate in a buck-boost mode to increase the output voltage on the selected output voltage rail.

According to a second aspect, there is provided a voltage regulator comprising: a source voltage rail and a plurality of output voltage rails, the voltage regulator configured to convert a source voltage on the source voltage rail to a respective output voltage on each output voltage rail; a controller configured to select an output voltage rail; and a comparator configured to compare the output voltage on the selected output voltage rail to a reference voltage for the selected output voltage rail; the controller further configured to control the voltage regulator to increase the output voltage on the selected output voltage rail if the output voltage of the selected output voltage rail is less than the reference for the selected output voltage rail, wherein the controller is configured to select an output voltage rail at a frequency which is dependent upon the rate at which the voltage regulator has previously increased the output voltage on that output voltage rail.

Suitably, the voltage regulator comprises a single comparator configured to compare the output voltage on each output voltage rail to a reference voltage for that output voltage rail.

Suitably, the voltage regulator further comprises: a power source; and a switching arrangement coupled between the power source and the plurality of output voltages rails, wherein the controller is configured to control the switching arrangement to apply current generated by the power source to the selected output voltage rail if the output voltage of the selected output voltage rail is less than the reference voltage for the selected output voltage rail.

Suitably, a switched mode power supply comprises the voltage regulator.

Suitably, the switched mode power supply is operable in a buck mode and a buck-boost mode, wherein the switched mode power supply is configured to operate in a buck mode to increase the output voltage on the selected output voltage rail if the source voltage exceeds the output voltage on the selected output voltage rail by more than a predetermined value.

Suitably, the switched mode power supply is operable in a buck mode and a buck-boost mode, wherein the switched mode power supply is configured to operate in a buck-boost mode to increase the output voltage on the selected output voltage rail if the source voltage does not exceed the output voltage on the selected output voltage rail by more than a predetermined value.

BRIEF DESCRIPTION OF THE DRAWINGS

This disclosure will now be described by way of example with reference to the accompanying figures. In the figures.

DETAILED DESCRIPTION

Figure 3:
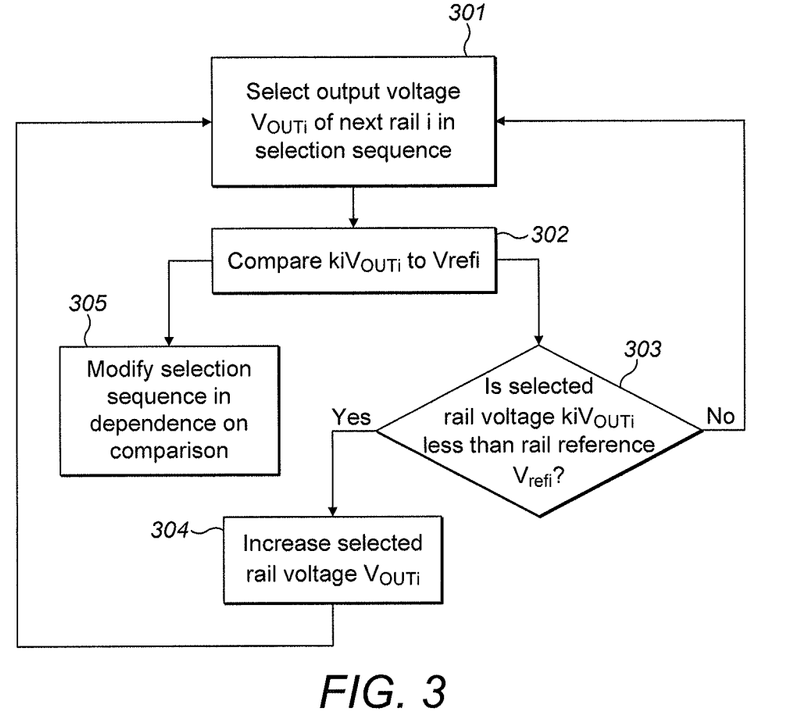
FIG. 3 is a flowchart which illustrates a method of operating the controller of FIG. 1.
Figure 4:
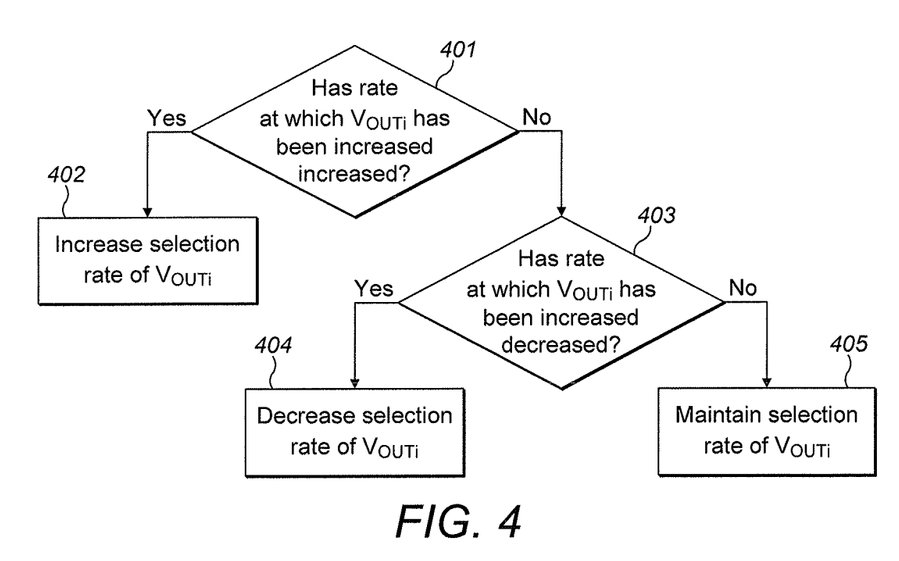
FIG. 4 is a flowchart which illustrates a method of assessing and changing the selection rate of an output voltage of an output voltage rail of FIG. 1.
Figure 5:
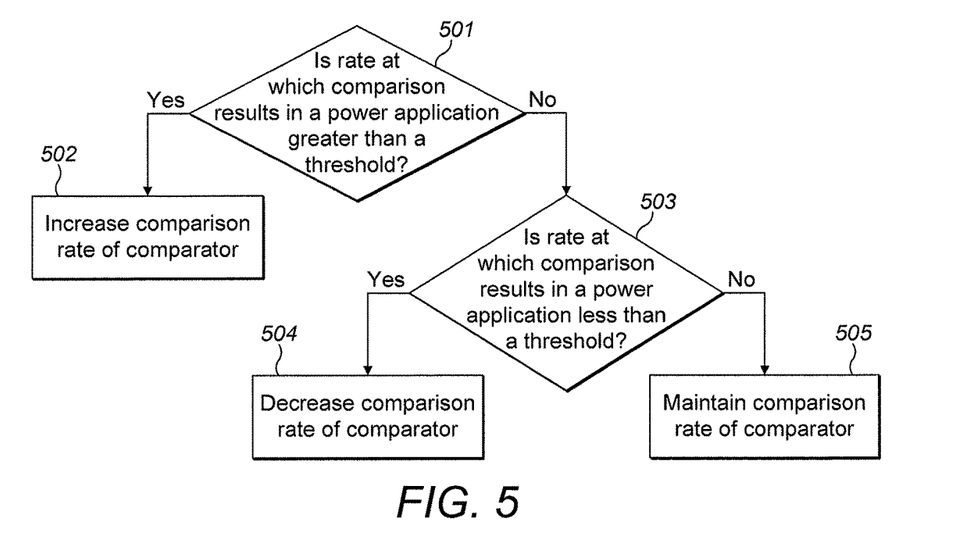
FIG. 5 is a flowchart which illustrates a method of assessing and changing the response rate of the power management unit of FIG. 1.

FIGS. 1, 2a, 2b, 2c and 7 are schematic diagrams of exemplary power management circuitry. These figures present components of this circuitry in terms of functional blocks. Some functional blocks for carrying out functions well known in the art have in places been omitted from these figures. FIGS. 3, 4 and 5 are flowcharts illustrating methods of implementing power management circuitry. Each flowchart depicts an order in which the method of that flowchart can be performed. However, the flowcharts are not intended to restrict the described methods to being implemented in the orders depicted. The steps of the methods may be carried out in alternative orders to those depicted in the flowcharts.

Figure 1:
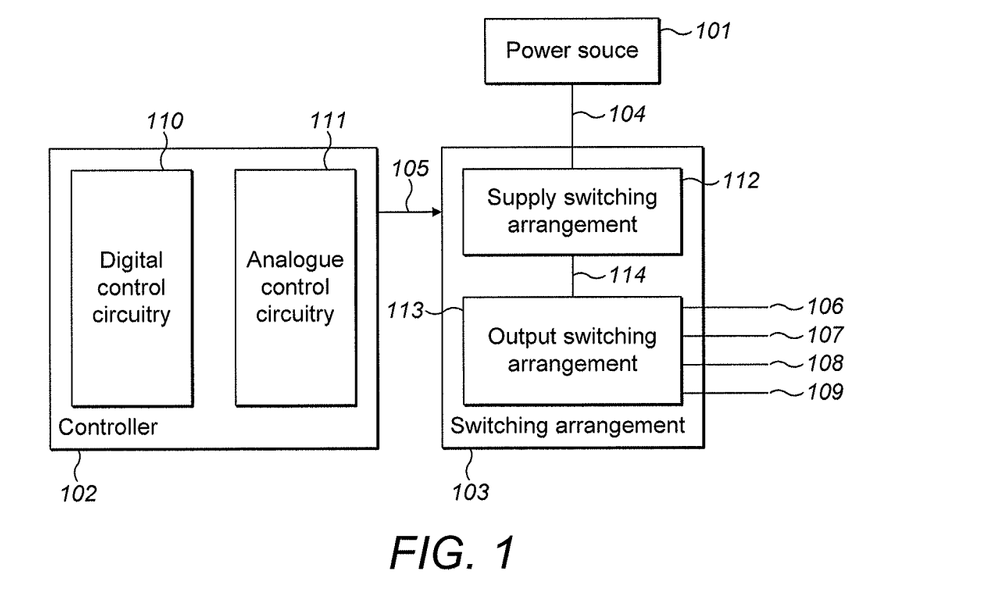
FIG. 1 illustrates an exemplary power management unit.

FIG. 1 illustrates the general structure of an exemplary power management unit. Power source 101 is connected to switching arrangement 103 by source voltage rail 104. Switching arrangement 103 is connected to output voltage rails 106, 107, 108 and 109. Controller 102 provides a control signal 105 to switching arrangement 103. Output voltage rails 106, 107, 108 and 109 provide output voltages to further circuitry not shown on FIG. 1. Four output voltage rails have been shown for illustration purposes only. The switching arrangement 103 may be connected to fewer or greater than four output voltage rails. The switching arrangement 103 may be connected to a single output voltage rail, or to a plurality of output voltage rails. The switching arrangement 103 connects the source voltage rail 104 to the output voltage rails through supply switching arrangement 112 and output switching arrangement 113, thereby enabling a supply voltage on supply voltage rail 104 to be converted to output voltages on output voltage rails 106, 107, 108 and 109. Supply switching arrangement converts the source voltage on source voltage rail 104 to an input voltage on input voltage rail 114. Output switching arrangement 113 switches the input voltage through to one of the output voltage rails. Controller 102 comprises digital control circuitry 110 and analogue control circuitry 111. Digital control circuitry 110 controls the analogue control circuitry 111 to control the switching arrangement 103.

Figure 2A:
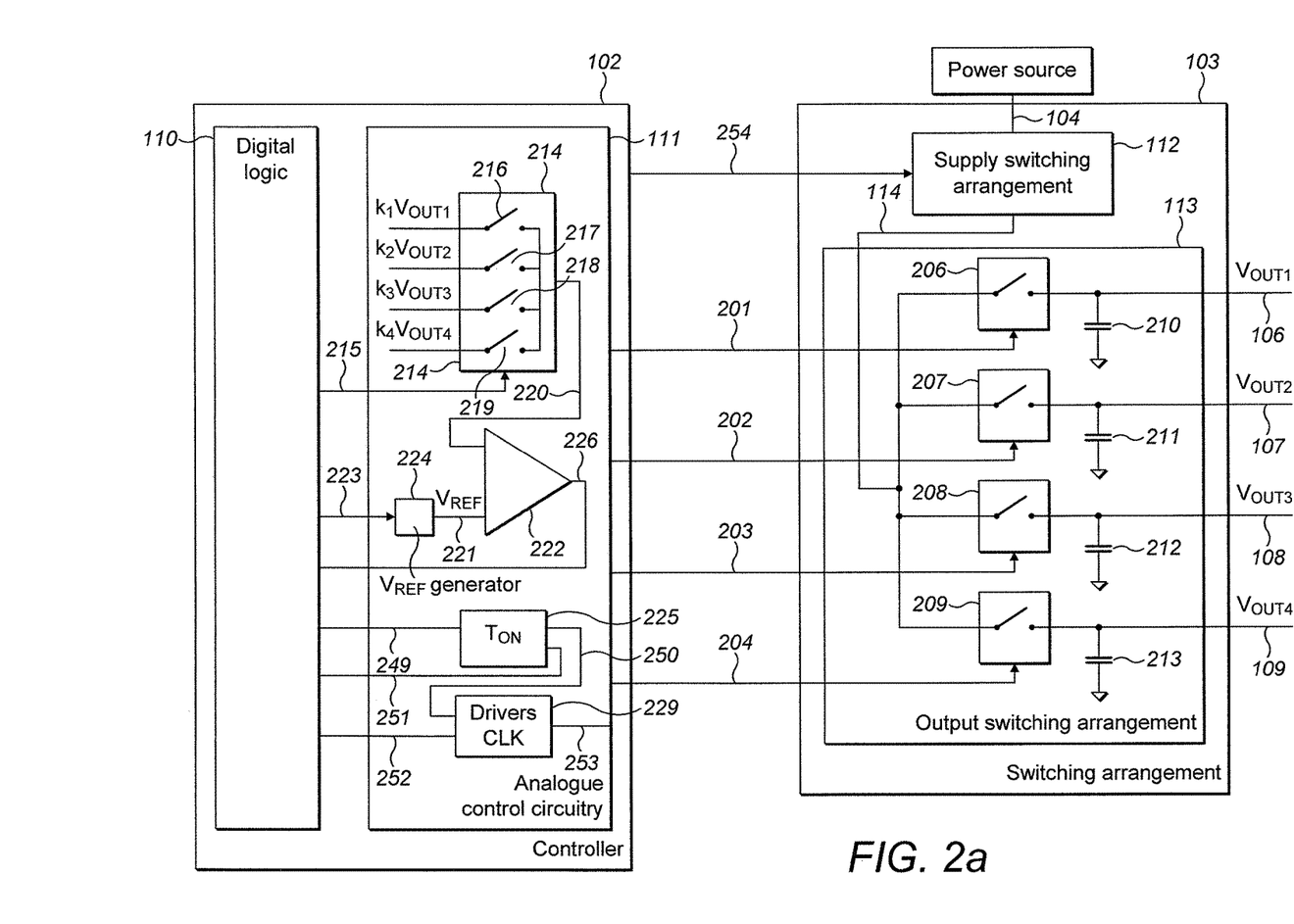
FIG. 2a illustrates an exemplary arrangement of the power management unit of FIG. 1.

FIG. 2a illustrates an exemplary arrangement of the power management unit of FIG. 1. Output switching arrangement 113 comprises a switch per output voltage rail. In this example, switching arrangement comprises four switches 206, 207, 208 and 209 connected respectively to output voltage rails 106, 107, 108 and 109. The input of each switch is connected to the input voltage rail 114 from the supply switching arrangement 112. The output of each switch is connected to its respective output voltage rail. Each output voltage rail is coupled to ground via a capacitor 210, 211, 212, 213. In FIG. 2a this capacitor is shown as internal to the switching arrangement. Alternatively, this capacitor may be external to the switching arrangement. For example, the capacitor may be off-chip. This capacitor acts to smooth out variations in the output voltage on the output voltage rail. Each switch receives a control signal via a control line 201, 202, 203, 204 from analogue control circuitry 111.

The output voltages on output voltage rails 106, 107, 108 and 109 are $V_{OUT1}$, $V_{OUT2}$, $V_{OUT3}$ and $V_{OUT4}$ respectively. Each of these output voltages is fed back to the controller 102. Digital control circuitry 110 comprises digital logic.

Analogue control circuitry 111 comprises switching controller 214. The output voltages $V_{OUT1}$, $V_{OUT2}$, $V_{OUT3}$ and $V_{OUT4}$ are fed into switching controller 214. Suitably, the inputs to the switching controller 214 are $k_1 V_{OUT1}$, $k_2 V_{OUT2}$, $k_3 V_{OUT3}$, and $k_4 V_{OUT4}$, where $k_1$, $k_2$, $k_3$ and $k_4$ are scalar values determined by a resistor divider ratio. Logic 110 selects one of $k_1 V_{OUT1}$, $k_2 V_{OUT2}$, $k_3 V_{OUT3}$ and $k_4 V_{OUT4}$ via control line 215. Switching controller 214 operates switches 216, 217, 218 and 219 to switch through the selected one of $k_1 V_{OUT1}$, $k_2 V_{OUT2}$, $k_3 V_{OUT3}$ and $k_4 V_{OUT}$ to line 220 under the control of digital logic 110.

Analogue control circuitry 111 further comprises comparator 222, $T_{ON}$ circuitry 225 and driver and clock circuitry 229. Comparator 222 receives two inputs: one is the output 220 of switching controller 214, and the other is a reference voltage $V_{REF}$ 221. $V_{REF}$ generator 224 generates $V_{REF}$ under the control of control signal 223 from digital logic 110. $V_{REF}$ is a reference voltage for the selected output voltage's output voltage rail. Comparator 222 compares the selected output voltage to the reference voltage for the selected output voltage rail. The output of comparator 222 is fed back to logic 110 on line 226.

Figure 2B:
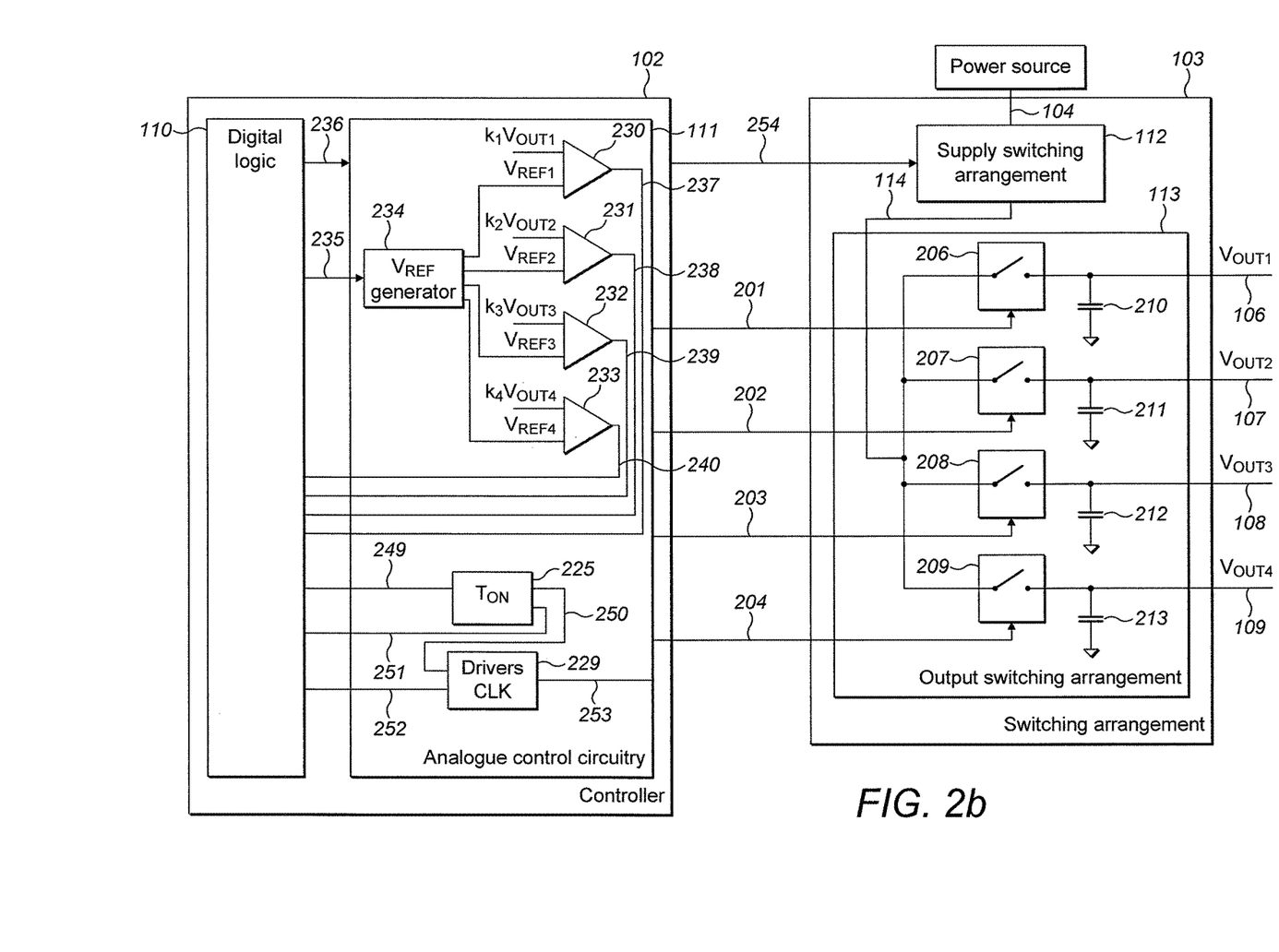
FIG. 2b illustrates an exemplary arrangement of the power management unit of FIG. 1.

FIG. 2b illustrates an alternative implementation of analogue control circuitry 111. In this implementation, analogue control circuitry 111 does not include switching controller 214. Instead, analogue control circuitry 111 comprises a plurality of comparators 230, 231, 232, 233, one for each output voltage rail. Each comparator receives two inputs: a value proportional to the voltage of an output voltage rail, and a reference voltage for that output voltage rail. For example, comparator 230 receives $k_1 V_{OUT1}$ and $V_{REF1}$. $V_{REF}$ generator 234 generates the voltage references of each of the output voltage rails $V_{REFi}$ (where i denotes an output voltage rail) under the control of control signal 235 from digital logic 110. The outputs 237, 238, 239 and 240 of each comparator are fed back to digital logic 110. Digital logic 110 selects which output voltage rail is being compared to its reference voltage at a comparator and controls analogue control circuitry accordingly under control line 236.

Figure 2C:
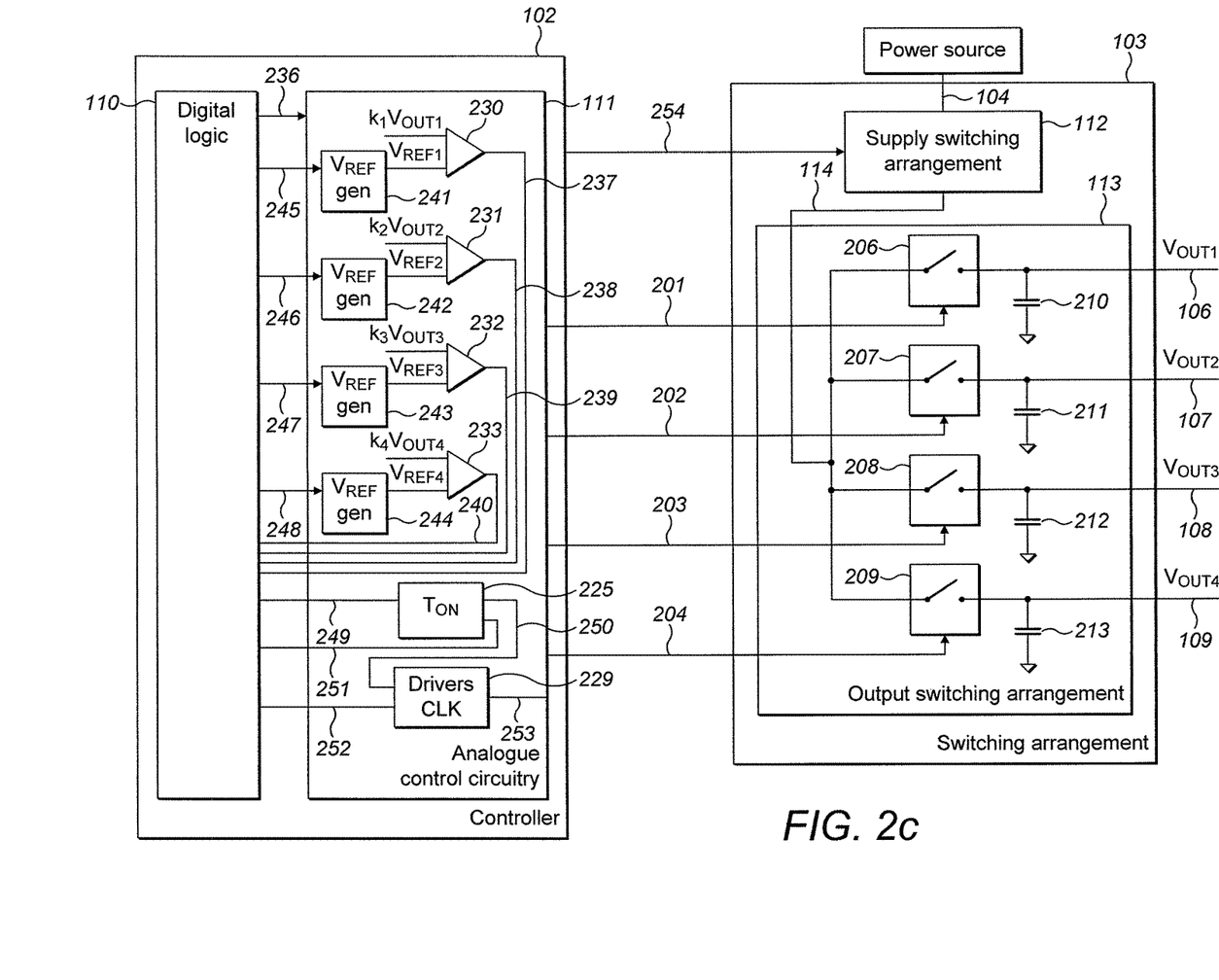
FIG. 2c illustrates an exemplary arrangement of the power management unit of FIG. 1.

FIG. 2c illustrates a further alternative implementation of analogue control circuitry 111. As in FIG. 2b, in this implementation analogue control circuitry 111 does not include switching controller 214. Instead, as in FIG. 2b, analogue control circuitry 111 comprises a plurality of comparators 230, 231, 232, 233, one for each output voltage rail. Each comparator receives two inputs: a value proportional to the voltage of an output voltage rail, and a reference voltage for that output voltage rail. For example, comparator 230 receives $k_1 V_{OUT1}$ and $V_{REF1}$. Each comparator is connected to a $V_{REF}$ generator which generates the voltage reference for the output voltage rail associated with that comparator, under the control of a control signal from the digital logic 110. For example, $V_{REF}$ generator 241 generates $V_{REF1}$ under the control of control signal 245 from digital logic 110. $V_{REF}$ generator 241 outputs $V_{REF1}$ to comparator 230 for comparison with $k_1 V_{OUT1}$. The outputs 237, 238, 239 and 240 of each comparator are fed back to digital logic 110. Digital logic 110 selects which output voltage rail is being compared to its reference voltage at a comparator and controls analogue control circuitry accordingly under control line 236.

In a further example, not depicted, analogue control circuitry 111 comprises more than one $V_{REF}$ generator, and at least one of the $V_{REF}$ generators generates the reference voltages $V_{REFi}$ of more than one but not all of the output voltage rails.

Logic 110 provides a control signal on control line 249 to $T_{ON}$ circuitry 225. Under the control of logic 110, the $T_{ON}$ circuitry 225 controls the duty cycle of the power supply. $T_{ON}$ circuitry 225 has two outputs. A first output 251 of $T_{ON}$ circuitry 225 is fed back to logic 110. A second output 250 of $T_{ON}$ circuitry is input to driver and clock circuitry 229 of analogue control circuitry 111. The driver and clock circuitry 229 also receives a control signal input from logic 110 on line 252. The driver and clock circuitry 229 controls the switches 206, 207, 208, 209 to change state via control lines 201, 202, 203, 204. The driver and clock circuitry 229 also controls the duty cycle of the power supply via control line 254.

In general, the controller 102 controls the supply of power from power source 101 to circuitry connected to output voltage rails 106, 107, 108 and 109. Digital control circuitry 110 controls analogue control circuitry 111 to close the switch 206 in order to supply power to output voltage rail 106. Similarly, digital control circuitry 110 controls analogue control circuitry 111 to close switch 207 in order to supply power to output voltage rail 107. And so on for the other output voltage rails. Suitably, when one switch of output switching arrangement 113 is closed, the other switches of switching arrangement 113 are open. This maintains isolation between the output voltages on output voltage rails 106, 107, 108 and 109. Hence, different output voltages can be maintained on output voltage rails 106, 107, 108 and 109. Controller 102 also controls how much power is supplied to an output voltage rail by controlling the input voltage on input voltage rail 114 and by controlling how long the switch of output switching arrangement 113 which is connected to that output voltage rail is closed for. Suitably, supply switching arrangement 112 implements a switched mode power supply. Controller 102 controls input voltage on input voltage rail 114 by controlling the duty cycle of the switched mode power supply.

Power management in integrated circuits is becoming an increasingly important area due to market demand for opposing characteristics of on the one hand greater functionality but on the other hand longer battery life/lower power. In order to minimise the power consumption of the circuitry connected to an output voltage rail of the power management unit, that circuitry may have one or more power states. In each power state, part or all of that circuitry is partially or completely powered down. The power state of the circuitry may vary quickly. Thus, the load on each output voltage rail and the power required by that load may vary quickly. The following description describes implementations of the controller 102 and switching arrangement 103 which enable them to respond quickly to the changing power requirements of circuitry connected to the output voltage rails of the power management unit.

Output voltages $V_{OUT1}$, $V_{OUT2}$, $V_{OUT3}$ and $V_{OUT4}$ on output voltage rails 106, 107, 108 and 109 are fed back to analogue control circuitry 111. Digital logic 110 selects one of these output voltages, which it then controls analogue control circuitry 111 to feed through to comparator 222 in the case of FIG. 2a or the appropriate comparator for that output voltage in the case of FIGS. 2b and 2c. Taking the example that $V_{OUT1}$ is selected, then in the case of FIG. 2a, switching controller 214 closes switch 216 in order to feed $k_1 V_{OUT1}$ through to comparator 222. Comparator 222 also receives a reference voltage $V_{REF1}$ from $V_{REF}$ generator 224. Comparator 222 compares $k_1 V_{OUT1}$ and $V_{REF1}$. The output of comparator 222 indicates how the scaled output voltage $k_1 V_{OUT1}$ differs from the reference voltage $V_{REF1}$. If the scaled output voltage $V_{OUT1}$ is less than $V_{REF1}$, then digital logic 110 controls analogue control circuitry 111 to apply a control signal on line 201 to close switch 206 for a set time period. During this time period, input voltage rail 114 connects to output voltage rail 106. The power supply outputs a voltage on the input voltage rail that is higher than $V_{OUT1}$ in order to increase the output voltage $V_{OUT1}$. The supply switching arrangement 112 is controlled by the controller 102 on line 254 to provide an appropriate input voltage on input voltage rail 114

Suitably, the voltage reference $V_{REF1}$ is given by:

$$V_{REF1} = V_{TARGET1} - \delta V_1 \quad \text{(equation 1)}$$

where $V_{TARGET1}$ is the target output voltage of output rail 106 scaled by $k_1$, and $\delta V_1$ represents a threshold amount. Thus, if $k_1 V_{OUT1}$ is less than a threshold amount $\delta V_1$ below the scaled target output voltage $V_{TARGET1}$ of output rail 106, no control signal is applied on line 201 to switch 206. Alternatively, if $k_1 V_{OUT1}$ is less than a threshold amount $\delta S_1$ below the scaled target output voltage $V_{TARGET1}$ of output rail 106, no control signal is applied on line 254 to supply switching arrangement 112. However, if $k_1 V_{OUT1}$ is more than a threshold amount $\delta V_1$ below the scaled target output voltage $V_{TARGET1}$ of output rail 106, then a control signal is applied on line 201 to switch 206 to connect the power supply to output voltage rail 106.

In the above example, $V_{OUT1}$ is selected. An analogous operation applies if any of $V_{OUT2}$, $V_{OUT3}$ or $V_{OUT4}$ is selected.

This method of comparing the output voltage of each output voltage rail against a reference voltage for that output voltage rail is an intrinsically stable way to control the application of power from a power supply. This is because, the determination to apply power to an output voltage rail is independent of the output voltages on the other output voltage rails.

A voltage reference $V_{REF1}$ (where i=1, 2, 3, 4 or more) may change over time. For example, if the power requirements of the circuitry connected to an output voltage rail i changes, then $V_{REF1}$ changes accordingly. A feedback loop from the circuitry connected to an output voltage rail i to controller 102 (not shown) is utilised by logic 110 to modify $V_{REF1}$ according to the requirements of the circuitry.

In one implementation of the operation of controller 102, logic 110 selects each output voltage rail in turn to assess the output voltage of that output voltage rail against a reference voltage for that output voltage rail. In other words, $V_{OUT1}$ of output voltage rail 106 would be assessed first, followed by $V_{OUT2}$ of output voltage rail 107, followed by $V_{OUT3}$ of output voltage rail 108, followed by $V_{OUT4}$ of output voltage rail 109, followed by $V_{OUT1}$ of output voltage rail 106 and so on.

FIGS. 3 to 6 illustrate different methods of operating controller 102, in which logic 218 determines a selection sequence in which the output voltages $V_{OUT1}$, $V_{OUT2}$, $V_{OUT3}$ and $V_{OUT4}$ of the output voltage rails 106, 107, 108 and 109 are selected for comparison against their respective reference voltages $V_{REF1}$, $V_{REF2}$, $V_{REF3}$ and $V_{REF4}$.

Turning first to FIG. 3. At step 301, logic 110 selects output voltage $V_{OUTi}$ of the next rail i in the selection sequence. Logic 110 controls analogue control circuitry 111 to switch $k_i V_{OUTi}$ through to the appropriate comparator. At step 302, the comparator compares $k_i V_{OUTi}$ to $V_{REFi}$. The comparator feeds its output back to logic 110. If, at step 303, the selected scaled rail voltage $k_i V_{OUTi}$ is determined to not be less than the voltage reference $V_{REFi}$, the method returns to step 301. If, at step 303, the selected rail voltage $k_i V_{OUTi}$ is determined to be less than the voltage reference $V_{REFi}$, then the output voltage $V_{OUTi}$ is increased at step 304 as described above. Following this, the method returns to step 301. At step 305, logic 110 uses the result of the comparison performed at step 302 in order to modify the selection sequence. Step 305 may be performed after every comparison event at step 302. Alternatively, the results of step 303 may be stored, and step 305 performed periodically using the stored results.

A selection sequence comprising an order of output voltage rails to be selected may be generated in advance, and modified every time step 305 is performed. Alternatively, the next output voltage rail of a selection sequence may be generated as it is needed using as inputs (i) the prior selection sequence, and (ii) the rate at which power has recently been applied to each output voltage rail.

FIG. 4 illustrates a method of assessing and changing the selection rate of the output voltage of an output voltage rail for comparison against a reference voltage for that output voltage rail. At step 401, logic 110 determines if the rate at which the output voltage $V_{OUTi}$ of the output voltage rail i has been increased by the power supply has increased. If the answer is YES, then at step 402, the selection rate of $V_{OUTi}$ is increased. In other words, logic 110 causes $V_{OUTi}$ to be compared against $V_{REFi}$ more often.

Application of current to an output voltage rail i only occurs following a comparison of the scaled output voltage on that rail $k_i V_{OUTi}$ against $V_{REFi}$. Thus, by increasing the rate at which the comparison events occur for that output voltage rail, the amount of current that is able to be supplied on that output voltage rail increases. This enables the power management unit to react more quickly to changing requirements by circuitry connected to the output voltage rail than if comparison events occur for each output voltage rail in turn. For example, if the circuitry connected to an output voltage rail is initially in a relatively inactive powered down mode, then the current output on that output voltage rail is low. If suddenly the circuitry connected to that output voltage rail enters an active mode which requires more current, then the reference voltage will quickly become much higher than the output voltage on the output voltage rail. Thus, the rate at which the comparison of the output voltage and the reference voltage results in current being supplied to that output rail increases. According to step 402 of FIG. 4, this leads to an increase in the selection rate of $V_{OUTi}$ for comparison with $V_{REFi}$. Thus, the output voltage $V_{OUTi}$ increases quickly back to its nominal level.

Returning to FIG. 4, if the answer to step 401 is NO, then at step 403, logic 110 assesses whether the rate at which the output voltage $V_{OUTi}$ of the output voltage rail has been increased has decreased. If the answer is YES, then at step 404, the selection rate of $V_{OUTi}$ is decreased. In other words, logic 110 causes $V_{OUTi}$ to be compared against $V_{REFi}$ less often.

By decreasing the rate at which the comparison events occur for an output voltage rail, the rate at which current is able to be supplied to that output voltage rail decreases. However, power is consumed by the comparator when it carries out each comparison. Thus, by reducing the number of comparison events for an output voltage rail, the power consumption of the power management unit itself is decreased.

If the answer to step 403 is NO, then at step 405 no action is taken to change the selection rate of $V_{OUTi}$.

Suitably, step 403 of FIG. 4 is performed before step 401. Suitably, steps 401 and 403 of FIG. 4 are performed at the same time.

Suitably, the method described above with respect to the flowchart of FIG. 4 is used to implement step 305 of FIG. 3. If the logic 110 determines to increase the selection rate of output voltage $V_{OUTi}$, then the selection sequence is modified such that the respective output voltage rail of $V_{OUTi}$ appears more frequently in the selection sequence. Suitably, the selection sequence is modified such that the respective output voltage rail of $V_{OUTi}$ is earlier in the selection sequence than if the output voltage rails had been taken in turn. If the logic 110 determines to decrease the selection rate of output voltage $V_{OUTi}$, then the selection sequence is modified such that the respective output voltage rail of $V_{OUTi}$ appears less frequently in the selection sequence. Suitably, the selection sequence is modified such that the respective output voltage rail of $V_{OUTi}$ is later in the selection sequence than if the output voltage rails had been taken in turn. Suitably, the selection sequence reflects the rate of change of output voltage on the output voltage rails. In other words, a first output voltage rail is selected to be earlier in the sequence than a second output voltage rail if the rate at which current has recently been supplied to the first output voltage rail is greater than the rate at which current has recently been supplied to the second output voltage rail.

FIG. 5 is a flowchart which illustrates a method of assessing and changing the response rate of the power management unit to an increase in power consumption by the output voltage rails as a whole. At step 501, logic 110 determines whether the rate at which the comparisons by the comparator result in applications of current by the power supply is greater than a threshold. If the answer is YES, then the controller responds by increasing the frequency of the comparisons by the comparator. Suitably, this is implemented at step 502 by increasing the comparison rate of the comparator, for example by increasing the clocking rate of the comparator. If the answer is NO, then the method moves to step 503. At step 503, logic 110 determines whether the rate at which the comparisons by the comparator result in applications of power by the power supply is less than a threshold. If the answer is YES, then the controller responds by decreasing the frequency of the comparisons by the comparator. Suitably, this is implemented at step 504 by decreasing the comparison rate of the comparator, for example by decreasing the clocking rate of the comparator. If the answer is NO, then no change is made to the frequency of the comparisons by the comparator at step 505.

Suitably, the assessment of FIG. 5 is performed after every time the comparator performs a comparison of an output voltage to a reference voltage. Alternatively, the assessment of FIG. 5 is performed periodically.

Figure 6:
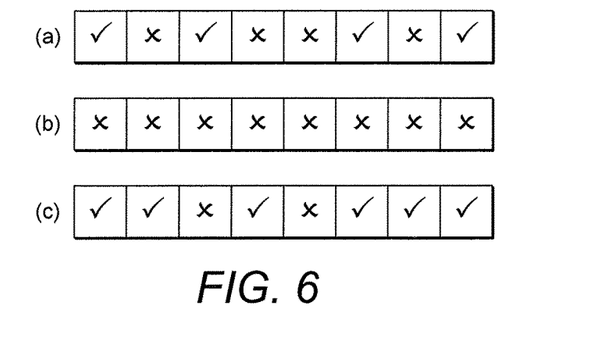
FIG. 6 illustrates exemplary results of voltage comparisons.

FIG. 6 illustrates example rates at which the comparisons performed by the comparator result in applications of current by the power supply to an output voltage rail. Each box represents a comparison. On each new comparison the oldest result is dropped off the queue. A tick in a box represents a comparison that results in an application of current to an output voltage rail. A cross in a box represents a comparison that results in no application of current to an output voltage rail. In FIG. 6(a), 4 out of 8 comparisons result in an application of current to an output voltage rail. In this case, the threshold in the method of FIG. 5 is set at ¼. Thus, the answer to step 501 is NO and the answer to step 503 is NO, hence no change is made to the comparison rate of the comparator. In FIG. 6(b), 0 out of 8 comparisons result in an application of current to an output voltage rail. In this case, the threshold in the method of FIG. 5 is set at ¼. Thus, the answer to step 501 is NO and the answer to step 503 is YES. Thus, the comparison rate of the comparator is decreased. Suitably, the comparison rate of the comparator is halved. In FIG. 6(c), 6 out of 8 comparisons result in an application of current to an output voltage rail. In this case, the threshold in the method of FIG. 5 is set at ¼. Thus, the answer to step 501 is YES. Thus, the comparison rate of the comparator is increased. Suitably, the comparison rate of the comparator is doubled. In the above example a threshold of ¼ is used. However, any suitable threshold may be set. This threshold may be dynamically changed. In the example above, the comparison rate is doubled at step 502 and halved at step 504. However, any suitable change may be made to the comparison rate.

As an alternative to determining whether the rate at which the comparisons by the comparator result in applications of current by the power supply is greater than a threshold at step 501, logic 110 may instead determine whether the rate at which current has been applied by the power supply is greater than a threshold. Similarly, as an alternative to determining whether the rate at which the comparisons by the comparator result in applications of current by the power supply is less than a threshold at step 503, logic 110 may instead determine whether the rate at which current has been applied by the power supply is less than a threshold. The remainder of FIG. 5 is the same in this alternative implementation.

Suitably, a predetermined value of current is output to an output voltage rail if the scaled output voltage on that output voltage rail is determined to be below the reference voltage for that output voltage rail. Suitably, this predetermined value of current is the same for each output voltage rail.

Suitably, step 503 of FIG. 5 is performed before step 501. Suitably, steps 501 and 503 of FIG. 5 are performed at the same time.

Figure 7:
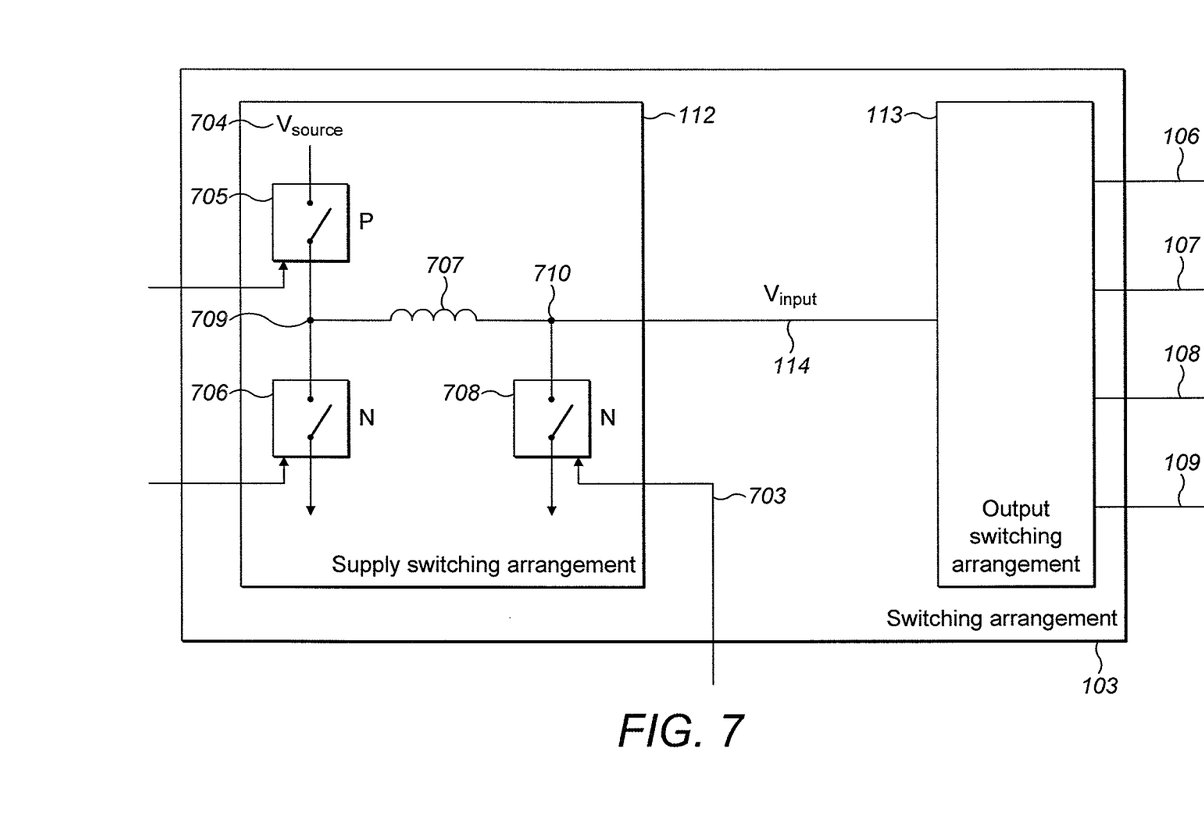
FIG. 7 illustrates an arrangement of the power supply of FIG. 1.

Suitably, the power supply is a switched mode power supply operable in a buck mode and a buck-boost mode. FIG. 7 illustrates a switching arrangement 103 to implement such a power supply. The supply switching arrangement 112 converts the source voltage $V_{SOURCE}$ 704 to input voltage $V_{INPUT}$ on input voltage rail 114 which is input to the output switching arrangement 113 to be switched through to output voltage rails 106, 107, 108, 109. Suitably, the source voltage is supplied by a battery. The source voltage $V_{SOURCE}$ is connected to a first switch 705. Suitably, switch 705 is a PMOS. The first switch 705 is connected to a second switch 706. Suitably, switch 706 is an NMOS. Switch 706 is also connected to ground. Node 709 is between switch 705 and switch 706. Inductor 707 is connected to node 709. Inductor 707 is also connected to the input voltage rail 114 having voltage $V_{INPUT}$. Node 710 is between inductor 707 and input voltage rail 114. A third switch 708 couples node 710 to ground. Suitably, switch 708 is an NMOS. Switch 705 receives a control signal from controller 102 on control line 701. Switch 706 receives a control signal from controller 102 on control line 702. Switch 708 receives a control signal from controller 102 on control line 703.

When operating in buck mode, the supply switching arrangement 112 acts as a step-down voltage converter. In other words, $V_{INPUT}$ is always less than $V_{SOURCE}$. In buck mode, control line 703 controls switch 708 to always remain open. In buck mode, controller 102 controls switches 705 and 706 via control lines 701 and 702 to open and close. The proportion of the time that the switches 705 and 706 are closed for is the duty cycle. The higher the duty cycle, the greater the average current on input voltage rail 114. Thus, the current on input voltage rail 114 and the input voltage on input voltage rail 114 is controllable by controller 102 in buck mode via control lines 701, 702 and 703.

When operating in buck-boost mode, the supply switching arrangement 112 can act as a step-up, step-down or no-step voltage converter. In other words, $V_{INPUT}$ can be greater than, less than or the same as $V_{SOURCE}$. During the periods when $V_{SOURCE}$ is greater than $V_{INPUT}$, the controller 102 controls switch 708 to remain open via control line 703.

Controller 102 controls switches 705 and 706 to open and close continually. This is the buck portion of the buck-boost mode. During the periods when $V_{SOURCE}$ is less than $V_{INPUT}$, the controller 102 controls switch 706 to remain open via control line 702 and controls switch 705 to remain closed via control line 701. Controller 102 controls switch 708 to continually open and close via control line 703. This causes an input voltage on input voltage rail 114 which is greater than the source voltage.

Suitably, the value of the source voltage $V_{SOURCE}$ is fed back to digital logic 110. Suitably, each time the controller 102 determines to increase the output voltage on an output voltage rail following a comparison event at the appropriate comparator, logic 110 determines whether the source voltage exceeds the output voltage of that output voltage rail by more than a predetermined value. If the source voltage does exceed the output voltage of that output voltage rail by more than a predetermined value, then the controller 102 controls the supply switching arrangement 112 to operate in buck mode during the time period in which the output switching arrangement 113 connects the input voltage rail 114 to the output voltage rail. The predetermined value is a small value which allows for variability in the input voltage. For example, the predetermined value is 300 mV. The input voltage varies due to the switching of switches 705 and 706. The input voltage may also vary due to variability in the source voltage. If the source voltage does not exceed the output voltage of that output voltage rail by more than a predetermined value, then the controller 102 controls the supply switching arrangement 112 to operate in buck-boost mode during the time period in which the output switching arrangement 113 connects the input voltage rail 114 to the output voltage rail.

Switches 705, 706 and 708 of the supply switching arrangement 112 are switched between ON and OFF states during buck-boost mode. Only switches 705 and 706 of the supply switching arrangement 112 are switched between ON and OFF states during buck mode. Each time a switch is switched some energy is dissipated as heat. Thus, it is more efficient to operate in the buck mode than the buck-boost mode. Thus, the controller 102 is configured to control supply switching arrangement 112 to operate in buck mode when possible to save power.

Suitably, digital logic 110 determines the current to be supplied to an output voltage rail from the power supply in dependence on the output voltage on the output voltage rail. The output voltages on the output voltage rails are fed back into the analogue control circuitry 111. The appropriate comparator compares the output voltage of an output voltage rail against a reference voltage for that output voltage rail. The result of this comparison is fed back to digital logic 110. Logic 110 uses the result of this comparison to determine the current value to be applied to the output voltage rail. Suitably, this current value is determined so as to bring the output voltage of the output voltage rail up to the reference voltage for that output voltage rail. Alternatively, the current value may be selected from one of a set of predetermined current values. Logic 110 determines the input voltage on input voltage rail 114, and also the time for which the output switching arrangement 113 connects the input voltage rail 114 to the output voltage rail in order to apply the determined current value to the output voltage rail.

In the case that the power supply is a switched mode power supply, logic 110 controls the power supply to modify the input voltage on input voltage rail 114 by adapting the duty cycle of the power supply. The higher the duty cycle of the power supply, the higher the input voltage on input voltage rail 114. Logic 110 increases the duty cycle by controlling $T_{ON}$ circuitry 225 to increase the $T_{ON}$ time. The $T_{ON}$ time is the time (during each cycle of the switched mode power supply) for which the switches in the switched mode power supply switch the source voltage $V_{SOURCE}$ through to the input voltage $V_{INPUT}$. The $T_{ON}$ circuitry 225 controls the drivers and clock circuitry 229 to drive the switches in the supply switching arrangement 112 for the specified $T_{ON}$ time. The specified $T_{ON}$ time is specific to the output voltage rail. Thus, the $T_{ON}$ time for different output voltage rails may be different. Analogue control circuitry 111 applies the control signal to the switches in the supply switching arrangement 112 via control line 254 (or control lines 701, 702, 703 of FIG. 7). Logic 110 controls the drivers and clock circuitry 229 via control line 252 to drive the switch in the output switching arrangement 113 that is connected to the output voltage rail for the determined time. Thus, the determined current value is applied to the output voltage rail.

Suitably, logic 110 controls the output switching arrangement 113 to connect the supply switching arrangement 112 to a selected output voltage rail in order to apply current to that output voltage rail at a time that is appropriate for the circuitry connected to the output voltage rail. Logic 110 is responsive to a control signal from the circuitry in order to determine an appropriate time for the current application. In other words, the current application to the load on the output voltage rail is synchronised to the operation of the load on that output voltage rail. This is useful for sensitive circuitry. Suitably, logic 110 determines the size of the current value to be applied to a selected output voltage rail in dependence on the circuitry that is connected to the selected output voltage rail. Logic 110 is responsive to a control signal from the circuitry in order to determine the size of the current value to be applied. Suitably, the more sensitive to current the circuitry connected to the selected output voltage rail, the smaller the size of the current value determined by logic 110 to be applied to the selected output voltage rail in a single current application event.

It is less efficient to apply a series of smaller current application events to an output voltage rail than to apply a single current application event which delivers an equivalent current. This is because applying a greater number of current applications involves utilising the comparator more often and switching a switch in output switching arrangement 113 more often. Thus more power is used by the controller 102 in a series of smaller current application events than a single larger current application event. However, a series of smaller current application events reduces the ripple in the output voltage compared to a single larger current application event. The ripple in the output voltage mainly results from the output voltage rising and falling due to the switching of the switched mode power supply. Some circuitry, such as transceiver circuitry, is very sensitive to the output voltage ripple. For such circuitry, reducing the output voltage ripple is more important than minimising the power loss in the controller 102. Suitably, the size of the current value which is applied to a selected output voltage rail is dynamically changeable as a function of the activity of the circuitry connected to the output voltage rail. This is communicated to logic 110 via a control line from the circuitry. Logic 110 adapts the size of the current value to be applied to the selected output voltage rail accordingly.

Circuitry attached to an output voltage rail may be sensitive to changes in the output voltage of that output voltage rail when that circuitry is active. Suitably, logic 110 is configured to detach the output voltage rail connected to sensitive circuitry from the power supply when that circuitry is active. In one implementation, this is implemented by logic 110 controlling the output switching arrangement 113 to retain the switch which connects the power supply to that output voltage rail in the open position during the time period that the circuitry is active for. Thus, the switch is maintained in the open position regardless of the result of the comparison between the output voltage on that output voltage rail and the reference voltage for that output voltage rail. Thus, even if the result of that comparison is that the output voltage on the output voltage rail is too low compared to the reference voltage, the switch is maintained in the open position. It may be that more than one output voltage rail is detached from the power supply at the same time. This may be, for example, because the circuitry connected to each detached rail individually is sensitive to changes in the output voltage on that output voltage rail when that circuitry is active. Alternatively, this may be because sensitive circuitry attached to one output voltage rails is sensitive to a change in the output voltage of the output voltage rail to which it is connected and also sensitive to a change in the output voltage of another output voltage rail to which it is not directly connected. A feedback signal from the sensitive circuitry to logic 110 identifies to logic 110 when the sensitive circuitry is active. Logic 110 is responsive to this feedback signal to control the output switching arrangement 113 to detach the output voltage rail connected to the sensitive circuitry from the power supply. In another implementation, a control signal from the sensitive circuitry to controller 102 may inform logic 110 that the sensitive circuitry is going to enter an active period prior to the active period beginning. Logic 110 is responsive to this control signal to control the output switching arrangement 113 to detach the output voltage rail connected to the sensitive circuitry from the power supply prior to the beginning of the active period.

An example of sensitive circuitry is transceiver circuitry. Suitably, the transceiver circuitry is detached from its output voltage rail whilst the transceiver circuitry is transmitting or receiving. Another example of sensitive circuitry is analogue to digital circuitry (ADC). Typically, an ADC reading uses successive approximations, and is thus very sensitive to changes in power. Suitably, the ADC is detached from its output voltage rail whilst an ADC reading is being taken. The output voltage on an output voltage rail that has an active load attached to it will drop when it is not connected to the power supply. Thus, following a period in which an output voltage rail has been detached from the power supply, logic 110 increases the selection rate of that output voltage rail. This enables current to be applied to that output voltage rail more quickly, and hence the output voltage of that output voltage rail reaches the reference voltage for that output voltage rail more quickly.

In the described power management unit, logic 110 responds to a difference between the scaled output voltage on the output voltage rail and a reference voltage for that output voltage rail in order to connect the power supply to that output voltage rail. When circuitry connected to an output voltage rail changes from a low power inactive mode to a high power active mode, the circuitry consumes current on the output voltage rail. Logic 110 responds to this by increasing the output voltage on the output voltage rail. However, the response is not immediate which means that there is a dip in the current on the output voltage rail before the power management unit reacts and connects the power supply to the output voltage rail. Suitably, a control signal from the circuitry connected to an output voltage rail to controller 102 is used to inform logic 110 when the circuitry is expected to enter an active period. Controller 102 responds to this control signal by applying current to the output voltage rail connected to that circuitry prior to the start of the active period. In other words, controller 102 causes the switching arrangement 103 to pre-emptively switch current through to the output voltage rail.

Suitably the pre-emptive power application to an output voltage rail is implemented as follows. Logic 110 receives the control signal indicating that circuitry connected to an output voltage rail is expected to enter an active period. Logic 110 increases the frequency of comparisons of the appropriate comparator. By reducing the interval between successive comparisons for that output voltage rail, the current on the output voltage rail does not have as long to reduce before undergoing a comparison which leads to it being increased again. Optionally, logic 110 increases the reference voltage of that output voltage rail, such that every time the comparator compares the output voltage of that output voltage rail to the reference voltage, the comparator output indicates that current is to be applied to that output voltage rail. Optionally, logic 110 also increases the rate at which that output voltage rail is selected to be switched through to the appropriate comparator. Thus, the output voltage rail is pre-charged prior to the increase in activity of the circuitry connected to the output voltage rail. Thus, no dip in voltage to the circuitry is observed when the circuitry begins its active period. Once the active period has begun, controller 102 reduces the frequency of the comparisons of the output voltage rail to the desired frequency, and operates according to the methods described with respect to FIGS. 3, 4, 5 and 6.

An output voltage rail may be pre-emptively charged if the circuitry to which it is connected is operable in a mode in which it is sensitive to changes in the output voltage of the output voltage rail. In this case, the output voltage rail is pre-emptively charged prior to the sensitive operation to a higher voltage than its normal output voltage. This is implemented by increasing $V_{REFi}$ for the period of the pre-emptive charging. The capacitor connected to the output voltage rail charges up during this time. Then during the sensitive operation, no additional current is applied to the output voltage rail. The output voltage rail is detached from the power supply. Instead, the capacitor releases its stored charge in order to supply current to the output voltage rail, which is then used by the sensitive circuitry. This is useful for circuitry which is nominally voltage independent but susceptible to noise, for example a low dropout regulator which has finite noise rejection properties.

Suitably, controller 102 implements soft current limiting to the output voltage rails. A maximum accumulative current value that can be applied to each output voltage rail per time period is defined. This maximum accumulative current value may be the same for each output voltage rail. For example, the maximum accumulative current value may be set in dependence on the power mode of the power management unit. By implementing a maximum accumulative current value for each output voltage rail, the situation in which one output voltage rail takes a large proportion of the current output from the power supply at the expense of the other output voltage rails can be avoided. Alternatively, the maximum accumulative current value may be different for each output voltage rail. For example, the maximum accumulative current value may be set in dependence on the operating characteristics of the circuitry connected to the output voltage rail. By implementing such a maximum accumulative current value, "overshooting" of current provided to circuitry at start-up can be avoided.

Controller 102 implements a counter which counts the number of current application events to an output voltage rail. If the counter exceeds a predetermined number of current application events in the set time period, then controller 102 prevents further application of current to that output voltage rail. This is the case even if a comparison event by the comparator indicates that current is to be applied to that output voltage rail. Suitably, controller 102 prevents the further application of current to that output voltage rail for a set period of time. After this set period of time, the counter is reset.

Suitably, controller 102 implements over current protection to the output voltage rails. A maximum accumulative current value that can be applied to an output voltage rail per time period is defined. Controller 102 implements a counter which counts the number of current application events to an output voltage rail. If the comparator indicates that the scaled output voltage on the output voltage rail has reached the reference voltage for that output voltage rail before a predetermined number of consecutive current application events has occurred, then then counter is reset. However, if the counter exceeds a predetermined number of consecutive current application events, then a fault condition is determined to be present. The controller 102 responds in an appropriate way. For example, controller 102 may respond by preventing further application of current to that output voltage rail.

Suitably, controller 102 monitors the current applied to each output voltage rail during each discrete current application event. Logic 110 infers the current applied to an output voltage rail during a discrete current application event from the following inputs: the output voltage of that output voltage rail prior to the current application event, the $T_{ON}$ time of the power supply, the $V_{SOURCE}$ of the power supply, and the number of times that the output switching arrangement 113 connects the supply switching arrangement 112 to the output voltage rail for. Controller 102 thus generates a current profile for each output voltage rail and/or a current profile for the combination of all the output voltage rails.

In one example, a current profile of the combination of all output voltage rails is used to predict (i) when the power source (Vsource) will need to be charged to maintain operation of the circuitry, and/or (ii) how much battery life is remaining. Suitably, one or both of these predictions are indicated to a user of the device into which the power management unit is integrated. For example, one or both of these predictions are indicated to a user of the device via a display.

In another example, a current profile for each output voltage rail and/or a current profile for the combination of all the output voltage rails is used to optimise the development process of circuitry attached to the power management unit. For example, the current profiles may indicate that several output voltage rails use current at the same time, followed by periods of relative inactivity on those output voltage rails. A response to such a situation is to reconfigure the chip firmware by, for example, pausing one high power non-time-critical operation whilst another high power time-critical operation is occurring. For example, a non-sensitive microprocessor could be paused whilst the radio is transmitting a signal. In such a manner, total energy usage from the power supply can be spread out over time to avoid energy usage peaks and hence potential for energy shortage.

Figure 8:
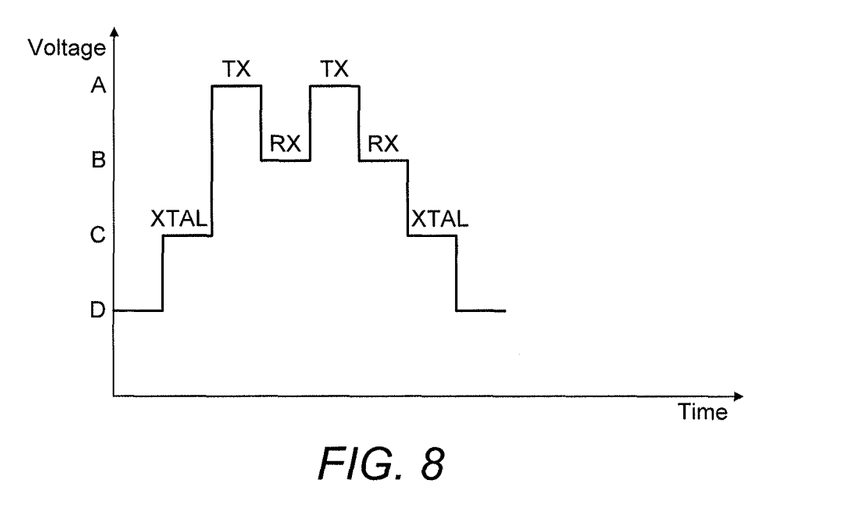
FIG. 8 illustrates an exemplary voltage profile of transceiver circuitry.

Suitably, controller 102 responds to sensing in the circuitry connected to an output voltage rail in order to dynamically adjust the current supplied to that output voltage rail. Suitably, the circuitry connected to the output voltage rail has different power domains. These power domains have different power requirements and hence different target voltage levels. These power domains may be different areas of circuitry which have different power requirements. Alternatively, the power domains may relate to different functions of the circuitry, and thus some circuitry may be included in more than one power domain. As an example, transceiver circuitry may have three power regions which relate to (i) transmission, (ii) reception, and (iii) neither transmission nor reception. FIG. 8 illustrates the different voltage requirements of these power domains. The transmit power domain requires voltage A, the receive power domain requires voltage B and the crystal domain (which is the neither transmit not receive domain) requires voltage C. Suitably, if the transceiver has more than one communication mode active, then there is a logical set of a transmission power domain, reception power domain and crystal power domain for each communication mode. This is because the power levels of the different communication modes differ, thus the voltage requirement of the transmission power domain for one communication mode is different to that of the transmission power domain for a different communication mode.

Suitably the voltage input to each power domain is compared to a reference voltage for that power domain within the load circuitry. Suitably, a plurality of comparators are located within the circuitry, each comparator performing this comparison for one power domain. Optionally each power domain may have multiple comparators for performing these comparisons. If the voltage input to any power domain is determined to be below the reference voltage then a headroom flag is generated. This headroom flag is sent in a control signal to controller 102. Logic 110 responds to the control signal by controlling the voltage reference generator to increase the comparator reference voltage $V_{REFi}$ (via control signal 223 in FIG. 2a, 235 in FIG. 2c, 245, 246, 247, 248 in FIG. 2c). This causes the output voltage on that output voltage rail to increase, and this is applied to all of the circuitry connected to that output voltage rail, not necessarily just the power domain that resulted in the generation of the headroom flag. After the control signal has been sent to controller 102, there is a time period T in which the circuitry waits for the application of current from the power supply. After this time period T has elapsed, the voltage input to each power domain is again compared to a reference voltage for that power domain by the plurality of comparators. If the voltage input to any power domain is determined to be below the reference voltage then a headroom flag is again generated and sent to controller 102 in a control signal. Controller 102 again responds by supplying power to the output voltage rail connected to the circuitry. Suitably, this process continues repeating.

Figure 9:
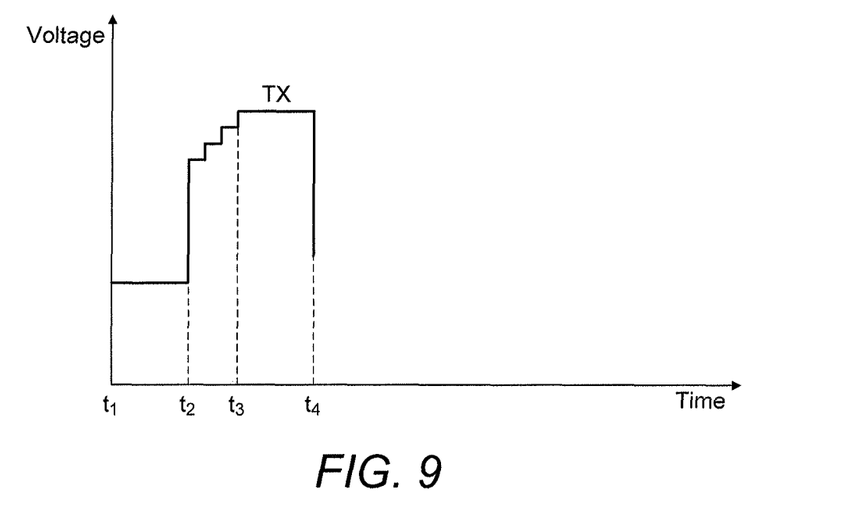
FIG. 9 illustrates a further exemplary voltage profile of transceiver circuitry.

In the case of transceiver circuitry, the value of the current applied to the output voltage rail in response to the headroom flag in the control signal is small. This is because the transceiver circuitry is sensitive to voltage ripple on the output voltage rail. FIG. 9 illustrates an example of the output voltage applied to transceiver circuitry. During time period $t_1$-$t_2$, the transceiver is in a lower power mode. In anticipation of the transmitter becoming active at time $t_3$, the power management unit pre-emptively increases the output voltage on the output voltage rail to the transceiver circuitry (as previously described). This occurs at time $t_2$. The output voltage is increased to close to the voltage needed for transmission. Then between times $t_2$ and $t_4$, the voltage input to the transmission power domain is compared to a reference voltage for that power domain. Each comparison between times $t_2$ and $t_3$ results in a headroom flag being generated and sent in a control signal to controller 102. Controller 102 responds by increasing the output voltage on the output voltage rail which is connected to the transceiver circuitry by a small amount. This is implemented by using a small $T_{ON}$ value. Thus the voltage applied to the transceiver circuitry steps up in small amounts between $t_2$ and $t_3$. By stepping the voltage up in small amounts, a smoother voltage increase is achieved which is more suitable for the sensitive transceiver circuitry. During the time period $t_3$ to $t_4$, the voltage input to the transmission power domain is generally the same as or above the reference voltage for that power domain. Thus, no headroom flag is generated and no control signal is sent to the controller 102. However, if the voltage input to the transmission power domain drops below the reference voltage, then the controller 102 responds to the control signal it receives from the transceiver circuitry by increasing the output voltage on the output voltage rail by a small amount. This is implemented by using a small $T_{ON}$ value. This reduces the voltage ripple experienced by the transceiver circuitry compared to if a larger current value is supplied to the output voltage rail. During the time period $t_3$ to $t_4$, the active load circuitry carries out its function.

This method of sensing different power domains of circuitry connected to an output voltage rail in order to dynamically adjust the power supply to that output voltage rail enables the power management unit to only supply the circuitry with the voltage needed for the operation that that circuitry is performing. In the example of the transceiver circuitry, when the transceiver is transmitting, voltage A is applied to the transceiver. However, when the transceiver is receiving, then the lower voltage B is applied to the transceiver.

The comparators draw a small current in order to perform the comparisons. Thus, to increase efficiency, suitably the comparisons are only performed on power domains that are expected to be active. For example, if the transceiver circuitry is receiving, then the comparisons are only performed on the receive power domain. No comparisons are performed on the transmit power domain.

Suitably, the time period T between comparisons is dynamically variable. If the output voltage on an output voltage rail needs to be increased quickly in small steps, then time period T is selected to be short. However, if the output voltage on an output voltage rail can be increased in fewer larger steps, or if the response does not need to be so fast then the time period T is selected to be longer. The longer the time period T, the slower the rate of comparisons performed by the comparators, and hence the more efficient the process.

The described power management unit is suitably incorporated within a computing-based device. The computing-based device may be an electronic device. Suitably, the computing-based device comprises one or more processors for processing computer executable instructions to control operation of digital control circuitry 110 to implement the methods described herein. The computer executable instructions can be provided using any computer-readable media such as a memory. Further software can be provided at the computing-based device to implement the methods described herein. The methods described herein may be performed by software in machine readable form on a tangible storage medium.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of operating a voltage regulator comprising a source voltage rail and a plurality of output voltage rails, the method comprising:
   converting a source voltage on the source voltage rail to an output voltage on each output voltage rail of the plurality of output voltage rails;
   selecting an output voltage rail from the plurality of output voltage rails;
   comparing the output voltage on the selected output voltage rail to a reference voltage for the selected output voltage rail;
   increasing, by the voltage regulator, the output voltage on the selected output voltage rail when the output voltage of the selected output voltage rail is less than the reference voltage of the selected output voltage rail,
   wherein a first frequency at which an output voltage rail is selected is dependent upon the rate at which the voltage regulator has previously increased the output voltage on the selected output voltage rail; and
   selecting a next output voltage rail from the plurality of output voltage rails and repeating the comparing and the increasing steps.

2. A method as claimed in claim 1, further comprising, for each output voltage rail, increasing the first frequency at which that output voltage rail is selected when the rate at which the voltage regulator has previously increased the output voltage on that output voltage rail increases.

3. A method as claimed in claim 1, further comprising, for each output voltage rail, decreasing the first frequency at which that output voltage rail is selected when the rate at which the voltage regulator has previously increased the output voltage on that output voltage rail decreases.

4. A method as claimed in claim 1, further comprising:
   selecting further output voltage rails to form a selection sequence; and
   performing the comparing step on each output voltage rail of the selection sequence,
   wherein a first output voltage rail is selected to be earlier in the sequence than a second output voltage rail when the rate at which the voltage regulator has previously increased the output voltage of the first output voltage rail is greater than the rate at which the voltage regulator has previously increased the output voltage of the second output voltage rail.

5. A method as claimed in claim 1, further comprising:
   selecting further output voltage rails;
   performing the comparing step on each of the further output voltage rails; and
   when the rate at which the comparing step leads to the increasing step exceeds a threshold, increasing a second frequency of the selecting and comparing steps.

6. A method as claimed in claim 5, wherein the voltage regulator comprises a comparator for performing the comparing step, the method comprising increasing the second frequency of the selecting and comparing steps by increasing the comparison rate of the comparator.

7. A method as claimed in claim 1, further comprising:
   selecting further output voltage rails;
   performing the comparing step on each of the further output voltage rails; and when the rate at which the comparing step leads to the increasing step is less than a threshold, decreasing a second frequency of the selecting and comparing steps.

8. A method as claimed in claim 7, wherein the voltage regulator comprises a comparator for performing the comparing step, the method comprising decreasing the second frequency of the selecting and comparing steps by decreasing the comparison rate of the comparator.

9. A method as claimed in claim 1, wherein the voltage regulator comprises a power source and a switching arrangement coupled between the power source and the plurality of output voltage rails, the method comprising increasing, by the voltage regulator, the output voltage on the selected output voltage rail by controlling the switching arrangement to apply current generated by the power source to the selected output voltage rail.

10. A method as claimed in claim 1, further comprising increasing, by the voltage regulator, the output voltage on the selected output voltage rail by applying a predetermined value of current to the selected output voltage rail.

11. A method as claimed in claim 1, wherein the voltage regulator is controlled to operate in a buck mode to increase the output voltage on the selected output voltage rail when the source voltage exceeds the output voltage on the selected output voltage rail by more than a predetermined value.

12. A method as claimed in claim 1, wherein the voltage regulator is controlled to operate in a buck-boost mode to increase the output voltage on the selected output voltage rail when the source voltage does not exceed the output voltage on the selected output voltage rail by more than a predetermined value.

13. A voltage regulator comprising:
a source voltage rail and a plurality of output voltage rails, the voltage regulator configured to convert a source voltage on the source voltage rail to an output voltage on each output voltage rail of the plurality of output voltage rails;
a controller configured to select an output voltage rail from the plurality of output voltage rails; and
a comparator configured to compare the output voltage on the selected output voltage rail to a reference voltage for the selected output voltage rail;
the controller further configured to control the voltage regulator to increase the output voltage on the selected output voltage rail when the output voltage of the selected output voltage rail is less than the reference voltage for the selected output voltage rail,
wherein the controller is configured to select an output voltage rail at a first frequency which is dependent upon the rate at which the voltage regulator has previously increased the output voltage on the selected output voltage rail.

14. A voltage regulator as claimed in claim 13, comprising a single comparator configured to compare the output voltage on each output voltage rail to a reference voltage for that output voltage rail.

15. A voltage regulator as claimed in claim 13, further comprising:
a power source; and
a switching arrangement coupled between the power source and the plurality of output voltages rails,
wherein the controller is configured to control the switching arrangement to apply current generated by the power source to the selected output voltage rail when the output voltage of the selected output voltage rail is less than the reference voltage for the selected output voltage rail.

16. A switched mode power supply comprising the voltage regulator of claim 13.

17. A switched mode power supply as claimed in claim 16, selectively operable in either a buck mode or a buck-boost mode, wherein the switched mode power supply is configured to operate in a buck mode to increase the output voltage on the selected output voltage rail when the source voltage exceeds the output voltage on the selected output voltage rail by more than a predetermined value.

18. A switched mode power supply as claimed in claim 16, selectively operable in either a buck mode or a buck-boost mode, wherein the switched mode power supply is configured to operate in a buck-boost mode to increase the output voltage on the selected output voltage rail when the source voltage does not exceed the output voltage on the selected output voltage rail by more than a predetermined value.

* * * * *